Patented July 13, 1954

2,683,724

UNITED STATES PATENT OFFICE 2,683,724

STEROID GLYOXALATES

John A. Hogg and Alan H. Nathan, Kalamazoo Township, Kalamazoo County, Mich., assignors to The Upjohn Company, Kalamazoo, Mich., a corporation of Michigan No Drawing. Application February 25, 1953, Serial No. 338,881

37 Claims. (Cl. 260—397.1)

The present invention relates to certain steroid glyoxalates and is more particularly concerned with 21 - alkoxyoxalyl - 11 - oxygenatedprogesterones, alkali-metal enolates thereof, 11-oxygenatedprogesterone-21-glyoxalic acids, and with a novel process for the production and use thereof. This application is a continuation-in-part of our copending applications S. N. 262,193, filed December 17, 1951, and S. N. 267,939, filed January 23, 1952, both now abandoned.

The novel compounds of the present invention may be represented by the following structural formula:

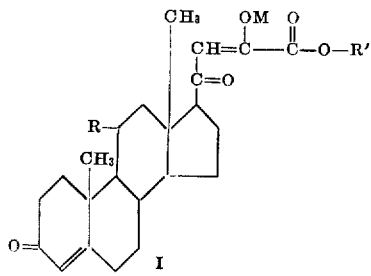

wherein R is selected from the group consisting of an α-hydroxy group, a β-hydroxy group and a ketonic oxygen (=O); wherein M is selected from the group consisting of hydrogen and an alkali metal; and wherein R' is selected from the group consisting of hydrogen and an alkyl group which is preferably lower-alkyl.

According to the method of the present invention, 11α-hydroxy, 11β-hydroxy, or 11-ketoprogesterone, is condensed with an alkyl diester of oxalic acid in an organic solvent therefor, in the presence of up to about one molar equivalent of an alkali-metal base to produce a 21-alkoxyoxalyl - 11 - oxygenatedprogesterone alkali - metal enolate represented by Formula I wherein M is an alkali metal.

It is an object of the present invention to provide novel 21-alkoxyoxalyl-11-oxygenated progesterone alkali-metal enolates, 21-alkoxyoxalyl-11-oxygenated progesterone-21-glyoxalic acids, and 21- alkoxyoxalyl-11-oxygenated progesterones. Another object of the present invention is the provision of a process for the production of novel 21-alkoxyoxalyl-11-oxygenated progesterone alkali-metal enolates. A further object of the present invention is the provision of a process for the production of 21-alkoxyoxalyl-11-oxygenated progesterone alkali-metal enolates without the concomitant formation of significant amounts of 11-oxygenated progesterones having an alkoxyoxalyl group or alkali-metal enolate thereof attached at other positions of the molecule. Still another object is the provision of a process wherein the starting 11-oxygenated progesterones are converted, through the 11-oxygenated-21-glyoxalated progesterones of the present invention, into useful and physiologically active steroids. Other objects will be apparent to those skilled in the art to which this invention pertains.

The prior art [Ruzicka and Plattner, Helv. Chim. Acta, 21, 1717 (1938)] teaches that a Δ⁴-3-keto steroid (cholestenone) can be glyoxalated, and in good yield, in the 2 positions. Later, Bockmuhl et al., U. S. Patent 2,265,417, issued December 9, 1941, found that a 20-keto steroid (pregnenolone) could be glyoxalated in the 21 position. It has now been found that, whereas it would be expected to obtain a 2-glyoxalated steroid product or a random mixture of 2- and 21-glyoxalated products, according to the teachings of the art, the glyoxalation occurs preferentially at the 21 position, under the conditions of the present invention, when 11α-hydroxyprogesterone, 11β-hydroxyprogesterone, or 11-ketoprogesterone, is used as starting compound. Under the conditions of the present invention, no significant amounts of 2,21-diglyoxalated and no 2-glyoxalated product are obtained in the process of the present invention.

The novel compounds of the present invention are useful precursors to known and new steroids, being readily convertible to such physiologically active steroids as corticosterone and dehydrocorticosterone, as illustrated in detail hereinafter. The alkali-metal enolates of the 21-alkoxyoxalyl steroids of the present invention are stable, water-soluble solids, the water solubility of which render them readily adaptable for further syntheses to reactions employing aqueous media. The free alkoxyoxalyl compounds are soluble in non-polar solvents such as, for example, benzene, chloroform, and the like, and insoluble in water, and the free acids are usually crystalline, recrystallizable solids, having distinct melting points, making them readily identifiable and purifiable and therefore especially useful when a starting compound of this type of a high or known degree of purity is necessary in further syntheses.

The novel compounds of the present invention of particular interest are those of Formula I wherein R is lower-alkyl, e. g., methyl, ethyl, propyl, butyl, isobutyl, amyl, hexyl, heptyl, octyl, or the like, especially methyl or ethyl. Preferred of these compounds are those of Formula I wherein M is an alkali metal, i. e., the alkali-metal enolates, and, of the alkali-metal enolates, the sodium enolates are preferred. The preferred compounds of the present invention, therefore, are those compounds of Formula I wherein R is α-hydroxy, β-hydroxy, or ketonic oxygen; M is an alkali metal, preferably sodium, and R is a lower-alkyl group, preferably methyl or ethyl. When M is hydrogen in Formula I, the formula represents the enolic form of the 21-alkoxyoxalyl-11-oxygenated steroid product.

The starting compounds of the present invention are 11α-hydroxyprogesterone [Peterson and Murray, J. Am. Chem. Soc., 74, 1871 (1952)], 11β-hydroxyprogesterone [Reichstein and Fuchs, Helv. Chim. Acta, 23, 684 (1940)], and 11-ketoprogesterone [Reichstein and Fuchs, Helv. Chim. Acta, 23, 684 (1940)].

In carrying out the process of the present invention, 11α-hydroxyprogesterone, 11β-hydroxyprogesterone, or 11-ketoprogesterone, is admixed with the selected alkali-metal base and dialkyl ester of oxalic acid in an organic solvent therefor, the order of mixing being non-critical, to produce a compound of the present invention represented by Formula I wherein M is an alkali metal and R' is alkyl. A free enol, i. e., wherein M is hydrogen, is conveniently prepared by the neutralization of an aqueous solution of an alkali-metal enolate thereof, thus precipitating the free enol. A free acid of the present invention, i. e., wherein M and R' are hydrogen, is prepared by the reaction of an alkali-metal enolate of the present invention with an alcoholic or aqueous solution of sodium or potassium hydroxide followed by the neutralization of the resulting reaction product to produce the corresponding free acid.

Reaction solvents which can conveniently be employed in the process of the present invention include benzene, toluene, xylene, and like aromatic hydrocarbons, methanol, ethanol, isopropyl alcohol, tertiary butyl alcohol, and other alcohols, tetrahydrofuran, dioxane, diethyl ether, Skellysolve B hexane hydrocarbons and other aliphatic hydrocarbons, mixtures of these solvents, and other essentially non-reactive solvents. Benzene, with or without small percentages of added alkanol, is usually the preferred solvent.

The glyoxalation reaction is usually conducted at room temperature although temperatures between about zero degrees centigrade and the boiling point of the reaction mixture are also operative. Usually the reaction proceeds with satisfactory rapidity at about room temperature, and temperatures substantially above room temperature, i. e., above about thirty degrees centigrade, are therefore usually not employed. However, when other than the methyl or ethyl ester of oxalic acid or when bases weaker than sodium methoxide or ethoxide are employed, temperatures substantially above room temperature may be required to obtain a satisfactory yield of 21-glyoxalated product.

The time necessary to obtain substantially complete reaction varies considerably between about one-half hour and several days, depending upon the reaction solvent, the reaction temperature, the selected dialkyl ester of oxalic acid, and the alkali-metal base employed, the moisture present in the reaction, and the molar ratios of the reactants. When sodium methoxide, methyl or ethyl oxalate, and benzene are employed at room temperature, the reaction is usually more than half completed in four hours and is usually complete in sixteen hours.

The process of the present invention is usually carried out in the absence of any significant amounts of water in any form in the reaction, as would be expected in a reaction of this type. Usually the alkali-metal base, when it is an alkali-metal alkoxide, is prepared in situ by the solution of an alkali metal in an alkanol, although the commercial forms of sodium methoxide have been successfully employed. To ensure the essentially complete exclusion of water from the reaction mixture, the solvent is usually carefully dried with a drying agent such as, for example, anhydrous sodium sulfate, calcium sulfate, calcium chloride, phosphorous pentoxide, sodium, or the like, or when an aromatic hydrocarbon is used as the solvent, a portion of the solvent is distilled before using.

Since the reaction is a reversible one, i. e., the reaction product in the presence of a large amount of an alkanol such as methanol or ethanol and a catalytic amount of base may undergo alcoholysis to give starting material, the presence of a large amount of methanol or ethanol in the reaction mixture is usually not desirable although satisfactory amounts of product have been obtained using ethanol as the sole reaction solvent.

Alkali-metal bases within the purview of the present invention include the alkali-metal alkoxides, e. g., sodium methoxide, sodium ethoxide, sodium isopropoxide, potassium tertiary butoxide, lithium methoxide, and the like, the alkali metals, the alkali-metal hydrides, alkali-metal amides and alkyl alkali-metals, e. g., sodium amide, triphenyl methyl sodium, and the like. Of these, the alkali-metal alkoxides, especially sodium methoxide and sodium ethoxide, are preferred for their convenience and consistently satisfactory results. The alkali-metal alkoxide may be used solvent-free, dissolved or suspended in a non-reactive solvent, or in situ in the alkanol in which said alkali-metal alkoxide was prepared. When potassium is used, it is usually used as the solution formed by its reaction with tertiary butyl alcohol according to procedure well known in the art. When up to about one molar equivalent of alkali-metal base is employed per mole of starting steroid, the above-described reaction is essentially a selective one, producing only 21-glyoxalated product. Use of substantially greater than molar equivalent amounts of alkali-metal base results in a substantial loss of the selective nature of the reaction and, for this reason, the reaction, for best results, should not be conducted in the presence of substantially more than about one molar equivalent of alkali-metal base. Best results are obtained with the use of about one molar equivalent of the alkali-metal base.

The presence, however, of substantially greater than one molar equivalent of alkyl ester of oxalic acid, per mole of starting steroid, is usually advantageous and promotes rapid completion of the reaction. The reaction is therefore usually carried out in the presence of greater than about one molar equivalent of alkyl oxalate. Alkyl esters of oxalic acid which are conveniently employed in the process of the present invention include the lower-alkyl esters of oxalic acid, e. g., methyl oxalate, ethyl oxalate, and the propyl, butyl, isobutyl, amyl, hexyl, heptyl, and octyl esters of oxalic acid, and the like. Since the methyl and ethyl esters of oxalic acid appear to undergo condensation with the starting steroid the most rapidly, methyl oxalate and ethyl oxalate are usually employed.

The thus-produced alkali-metal enolate may be separated by the addition of a large volume of an organic solvent in which the alkali-metal enolate is insoluble, such as ether, pentane, or benzene, for example. Another method of producing a somewhat purer alkali-metal enolate comprises acidification of a cold aqueous solution of the thus-precipitated alkali-metal enolate to precipitate the free enol and then treating a solution of the free enol in ether or benzene with a chemical equivalent of sodium methoxide, thus reprecipitating the sodium enolate. When the glyoxalation is carried out in the presence of substantial amounts of methyl or ethyl alcohol, the removal of said alcohol by distillation at reduced pressure before the addition of an additional amount of solvent is preferred, if a high yield of product is desired. The free enols, which may be obtained by the acidification of an aqueous solution of an alkali-metal enolate, are amorphous solids which do not appear to be crystallizable from the ordinary organic solvents.

The free acids are usually prepared by reaction of a solution of the alkali-metal enolates with an additional chemical equivalent or greater amount of an alcoholic or aqueous solution of a base such as sodium or potassium hydroxide, usually at about room temperature, for several hours. Acidification of the resulting solution with dilute aqueous acid precipitates the thus-produced 21-glyoxalic acid which may then be purified by fractional crystallization or other manner known in the art.

The alkali-metal enolates of the present invention are converted to 21-acyloxy compounds such as, for example, corticosterone acetate, 11-epicorticosterone acetate, 11-dehydrocorticosterone acetate, and compounds wherein the acetate group of the above compounds is replaced by an acylate group such as, for example, formate, propionate, butyrate, valerate, octanoate, benzoate, cyclopentylpropionate, or other acylate group formed by the reaction of the intermediately formed 21-iodo compound, i. e., 21-iodo-11α-hydroxyprogesterone, 21-iodo-11β-hydroxyprogesterone, and 21-iodo-11-ketoprogesterone, with a salt, usually an alkali-metal salt, of the selected organic carboxylic acid, e. g., β-cyclopentylpropionic, trimethylacetic, dimethylacetic, benzoic, cyclopentylformic, or the like acid. A convenient method of producing said compounds comprises treatment of the precipitated 21-iodo compound with an acetone or alcoholic solution of the selected salt, e. g., sodium or potassium salt of the selected acid at a temperature between about room temperature and the boiling point of the reaction mixture for from about one hour to several days.

The intermediate 21-iodo compound is conveniently prepared by treating a methanolic solution of the selected alkali-metal enolate with a molar equivalent of iodine at a relatively low temperature, e. g., about zero degrees centigrade, followed by a base and an alkanol whereafter the resulting 21-iodo compound may be precipitated by the addition of water to the mixture.

The following examples are illustrative of the process and products of the present invention, but are not to be construed as limiting.

*Example 1.—11α-hydroxy-21-ethoxyoxalylprogesterone and the sodium enolate thereof*

Three and three-tenths (3.3) grams (0.01 mole) of 11α-hydroxyprogesterone [Peterson and Murray, J. Am. Chem. Soc., 74, 1871 (1952)], was dissolved in a solution of 0.25 gram (0.0109 gram-atom) of sodium in eight milliliters of absolute ethanol and 1.46 grams (0.01 mole) of ethyl oxalate was added thereto. The resulting solution was allowed to stand for six hours at room temperature, during which time the color of the solution changed from yellow to brown. The sodium enolate of 11α-hydroxy-21-ethoxyoxalylprogesterone thus-produced was isolated by the addition of a large volume of ether as a yellow amorphous solid which decomposed above 200 degrees centigrade.

The structure of this yellow solid was confirmed by infrared analysis which showed the following significant absorption: (1) strong absorption at about 1720 cm.$^{-1}$ which is within the range for a conjugated ester, thus indicating the presence of such a group and substantiating the success of the reaction; (2) strong absorption at about 1631 cm.$^{-1}$ and about 1465 cm.$^{-1}$, these absorption bands being characteristic of metal enolates, which evidences that a sodium enolate was obtained as postulated; (3) strong absorption at about 1670 cm.$^{-1}$ which is characteristic of a simple conjugated ketone, thus verifying the unchanged characteristics of the $\Delta^4$-three keto group of the starting 11α-hydroxyprogesterone and negating the possibility of condensation at position two. The condensation therefore took place at the other activated position, namely, position 21.

11α - hydroxy - 21-ethoxyoxalylprogesterone is prepared by the acidification with dilute hydrochloric acid of an aqueous solution of the thus-produced sodium enolate. Filtration of the precipitate, followed by a wash with water and drying in a vacuum desiccator, produces essentially pure 11α-hydroxy-21-ethoxyoxalylprogesterone.

*Example 2.—11β-hydroxy-21-ethoxyoxalylprogesterone and the sodium enolate thereof*

One hundred and forty-four (144) milligrams (6.26 milligram-atoms) of sodium was dissolved in five milliliters of absolute ethanol under an atmosphere of nitrogen and to this solution was added eight milliliters of benzene and 0.8 milliliter (0.9 gram; 6.16 millimoles) of ethyl oxalate. The mixture was cooled in an ice-water bath and a solution of 1.99 grams (6.03 millimoles) of 11β-hydroxyprogesterone, dissolved in five milliliters of absolute ethanol and mixed with 25 milliliters of dry benzene, was aded in a slow stream to the stirred solution. The reaction mixture was stirred at room temperature for 2.5 hours, at the end of which time a 100-milliliter portion of ether was added followed by another 100-milliliter portion of ether one hour later. The thus-produced pale yellow precipitate was filtered and washed with ether. The yield was 1.68 grams (62 percent).

The yellow solid, identified as the sodium enolate of 11β-hydroxy-21-ethoxyoxalylprogesterone by conversion to the known corticosterone acetate, displayed the following significant infrared absorption: (1) strong absorption at about 1716 cm.$^{-1}$, which is within the range of a conjugated ester; (2) strong absorption at about 1634 cm.$^{-1}$ and 1470 cm.$^{-1}$, these absorption bands being characteristic of metal enolates; (3) strong absorption at about 1670 cm.$^{-1}$ which is characteristic of simple conjugated ketones; these absorption bands verifying the theoretical structure.

Example 3.—Sodium enolate of 11-keto-21-ethoxyoxalylprogesterone

To a mixture of 3.4 milliliters of a 3.4 normal methanolic sodium methoxide solution (0.0116 mole), 0.45 milliliter of absolute ethanol, and twenty milliliters of dry benzene, said mixture previously having been distilled until eight milliliters of distillate had been collected and then cooled, was added 2.3 milliliters (0.0151 mole) of ethyl oxalate and a solution of 3.28 grams (0.01 mole) of 11-ketoprogesterone in 38 milliliters of dry benzene. The solution became turbid and a yellow precipitate formed. The reaction mixture was stirred for ninety minutes, 55 milliliters of ether was then added thereto, and stirring was continued for sixty minutes, whereafter a 130-milliliter portion of ether was added thereto. The thus-formed yellow precipitate of the sodium enolate of 11-keto-21-ethoxyoxalylprogesterone was filtered, washed with several fifty-milliliter portions of ether, and after drying found to weigh 3.65 grams. The ether wash contained 0.54 gram of unreacted 11-ketoprogesterone. The yield of the sodium enolate of 11-keto-21-ethoxyoxalylprogesterone was 81 percent of the theoretical or practically quantitative calculated on the reacted 11-ketoprogesterone. The presence of a sodium enolate was verified by the extreme solubility of the product in water and by a positive ferric chloride test for enols as exhibited by the formation of a bright red color when the product was dissolved in alcohol and aqueous ferric chloride solutions.

Example 4.—11-keto-21-ethoxyoxalylprogesterone and the sodium enolate thereof A series of reactions were carried out between 11-ketoprogesterone, ethyl oxalate and sodium methoxide, varying the time, molar ratio of reactants, temperature and solvent in the reaction to determine the effect of these variables on the yield of product. The results are tabulated on Table I and the reaction conditions used in each of these runs is illustrated in the exemplary reaction described below.

A solution of 3.37 milliliters (0.0115 mole) of a 3.12 normal methanolic sodium methoxide solution, 0.45 milliliter of absolute ethanol, and twenty milliliters of benzene was distilled until about eight to ten milliliters of solvent had been removed, and 1.34 milliliters (0.0092 mole) of ethyl oxalate and 7.5 milliliters of absolute ethanol were then added thereto, followed by the addition of a solution of 3.23 grams (0.01 mole) of 11-ketoprogesterone in 38 milliliters of benzene. The mixture was stirred for two hours at room temperature whereafter 55 milliliters of anhydrous ether was then added thereto followed one hour later by an additional 130 milliliters of ether. After stirring the resulting mixture for another hour the resulting yellow precipitate was filtered from the supernatant liquid, washed with ether and dried to yield 3.12 grams of the sodium enolate of 11-keto-21-ethoxyoxalylprogesterone, a yield of 69 percent of the theoretical. The ethereal filterate contained 1.26 grams of solid water-insoluble material which consisted in part of unreacted 11-ketoprogesterone. The sodium enolate was converted to the free enol, 11-keto-21-ethoxyoxalylprogesterone, by dissolving the thus-produced sodium enolate in water and acidifying with dilute hydrochloric acid, filtering the thus-precipitated nearly white enol and washing it with water. The dried enol weighed 2.54 grams, a yield of sixty percent of the theoretical, based on the starting 11-ketoprogesterone.

TABLE I.—GLYOXIDATION STUDIES ON 11-KETOPROGESTERONE

| Run | Solvent (Milliliters) | Equivalents of NaOCH₃ [1] | Equivalents of Ethyl Oxalate [1] | Yield (Grams) [2] |
|---|---|---|---|---|
| 1 | benzene, 38 ml | 1.05 | 1.00 | 2.295 |
| 2 | do | 1.15 | 1.71 | 3.179 |
| 3 | do | 1.05 | 1.71 | 2.727 |
| 4 | benzene, 38 ml / EtOH, 2.5 ml | 1.05 | 1.71 | 2.76 |
| 5 | benzene, 38 ml / EtOH, 5 ml | 1.05 | 1.71 | 2.36 |
| 6 | benzene, 38 ml / EtOH, 7.5 ml | 1.05 | 1.71 | 2.54 |
| 7 | benzene, 38 ml / EtOH, 10 ml | 1.05 | 1.71 | 1.68 |
| 8 | benzene, 38 ml / EtOH, 2.5 ml | 1.15 | 1.71 | 2.59 |
| 9 | benzene, 38 ml / EtOH, 5 ml | 1.15 | 1.71 | 2.6 |
| 10 | EtOH, 58 ml | 1.05 | 1.71 | 2.073 |
| 11 | t-BuOH, 125 ml | 1.05 | 1.71 | [3] .470 |
| 12 | benzene, 38 ml | 1.05 | [4] 1.71 | [5] 2.803 |
| 13 | benzene, 38 ml / EtOH, 7.5 ml | 1.05 | 1.71 | [5] 2.674 |

[1] Per mole of 11-ketoprogesterone.
[2] Yield of free enol obtained by acidification of aqueous solution of sodium enolate.
[3] Reaction carried out at fifty degrees centigrade. A recovery of 83 percent of the starting 11-ketoprogesterone was obtained from the reaction.
[4] Methyl oxalate was used.
[5] The reaction was carried out for sixteen hours.

Example 5.—Potassium enolate of 11-keto-21-ethoxyoxalylprogesterone

Using essentially the procedure described in Example 3, 11-ketoprogesterone is converted to the potassium enolate of 11-keto-21-ethoxyoxalylprogesterone by reaction with ethyl oxalate in benzene and potassium in tertiary butyl alcohol.

In the same manner as described in Examples 1 through 4, the following compounds are prepared by the reaction of 11α-hydroxyprogesterone with an alkyl oxalate and sodium alkoxide, wherein the alkyl group of the product corresponds to the alkyl group of the alkyl oxalate and preferably to the alkyl group of the selected sodium alkoxide: the sodium enolates of 11α-hydroxy-21-methoxyoxalylprogesterone, of 11α-hydroxy-21-propoxyoxalylprogesterone, of 11α-hydroxy-21-octyloxyoxalylprogesterone, and of other 11α-hydroxy-21-alkoxyoxalylprogesterones, especially wherein the alkoxy group is lower-alkoxy. The corresponding 11β-hydroxy and 11-keto analogues of the above-named compounds are prepared by the substitution of 11β-hydroxyprogesterone and 11-ketoprogesterone, respectively, as starting steroid in the above-described reaction.

The potassium enolate analogues of the above-named compounds are prepared by the substitution of potassium tertiary butoxide for the sodium methoxide used in the above-described reaction.

Acidification of an aqueous solution of any of the above-described alkali-metal enolates is productive of a precipitate of the corresponding free enol.

Example 6.—11-ketoprogesterone-21-glyoxalic acid

A solution of the sodium enolate of 11-keto-21-ethoxyoxalylprogesterone is dissolved in a dilute solution of a large molar excess of potassium hydroxide in methanol, whereupon the potassium salt of the 21-glyoxalic acid begins to precipitate immediately as a yellow amorphous solid. The precipitated potassium salt it then filtered, dissolved in water, and the solution made acidic with acetic acid. The free acid precipitates as a yellow amorphous solid. Several crystallizations of this precipitate from ethyl alcohol gives colorless needles melting at 212 to 213 degrees centigrade with decomposition. This compound gives a deep red color with alcoholic ferric chloride.

*Example 7.—11α-hydroxyprogesterone-21-glyoxalic acid*

The reaction mixture obtained according to the method of Example 1, before isolation of the sodium enolate, was treated with a dilute solution of methanolic potassium hydroxide which immediately caused the potassium salt of the 21-glyoxalic acid of 11α-hydroxyprogesterone to precipitate as a yellow amorphous solid weighing 970 milligrams. The potassium salt was then converted to the free 21-glyoxalic acid of 11α-hydroxyprogesterone by dissolving the potassium salt in water and acidifying the solution with acetic acid. The free acid precipitated as a yellow amorphous solid, the structure of which was established by infrared analysis which showed absorption at about 1670 cm.$^{-1}$, as did the sodium enolate, which is in the range of the absorption of a typical conjugated ketone of a simple $\Delta^4$-three keto steroid without adjacent influencing groups, thus negating once more the possibility of a group at the 2 position resulting from a condensation reaction at that position. Further, absorption was noted at about 1736 cm.$^{-1}$, which is within the range of an α-keto carboxylic acid group absorption, evidencing presence of the said group in the product. Since the absorption pattern indicated that condensation had not taken place adjacent to the $\Delta^4$-three keto group, the condensation took place at the other activated position, namely, at the 21 position.

*Example 8.—11β-hydroxyprogesterone-21-glyoxalic acid*

Following the procedure described in Example 6, 11β-hydroxyprogesterone-21-glyoxalic acid is prepared by the reaction of the sodium enolate of 11β - hydroxy - 21 - ethoxyoxalylprogesterone with sodium hydroxide in methanol.

*Example 9.—11β-hydroxy-21-acetoxyprogesterone (corticosterone acetate)*

The sodium enolate of 21-ethoxyoxalyl-11β-hydroxyprogesterone was converted to 21-acetoxy-11β-hydroxyprogesterone (corticosterone acetate) in the following manner: 1.64 grams of the sodium enolate of 21-ethoxyoxalyl-11β-hydroxyprogesterone, obtained in the manner described above, was dissolved in thirty milliliters of methanol and to the resulting solution was added three milliliters of water. To this mixture was added dropwise at room temperature a solution of 0.92 gram of iodine in 22 milliliters of methanol, the addition being completed in one-half hour. The dark brown reaction mixture was stirred for an additional hour at the end of which time there was added 1.1 milliliters of a 3.4 normal methanolic solution of sodium methoxide. The resulting yellow solution was stirred for ten minutes and then diluted with fifty milliliters of water which caused precipitation of 0.5 gram of brown product melting at 75 degrees centigrade to 85 degrees centigrade and decomposing into black material at 137 to 138 degrees centigrade. The filtrate was mixed with 300 milliliters of saturated aqueous sodium chloride solution and chilled in a refrigerator for two hours to give a yellow precipitate which was filtered and washed with water. The yield of dry 21-iodo-11β-hydroxyprogesterone, melting at 85 to 90 degrees centigrade and decomposing to a black material at 136 to 144 degrees centigrade, was 0.57 gram. The brown precipitate first obtained was chromatographed over Florisil (synthetic magnesium silicate). The fraction of 21-iodo-11β-hydroxyprogesterone, which was eluated by a solvent mixture composed of nine parts of hexane hydrocarbons (Skellysolve B) to one part of acetone, melted at 116 to 121 degrees centigrade with decomposition and was converted in a yield of 98 percent of theoretical to corticosterone acetate in the manner described below.

A mixture of the 0.57 gram of 21-iodo-11β-hydroxyprogesterone, obtained by precipitation with the saturated sodium chloride solution and chilling, one gram of potassium acetate dissolved in 2.5 milliliters of water, 25 milliliters of ethyl acetate, five milliliters of ethyl alcohol (3A) and about 0.6 milliliter of acetic acid was boiled with refluxing for three hours and then evaporated to dryness with a current of air at room temperature. The residue was washed with water and once more dried with a current of air, dissolved in benzene and chromatographed over forty grams of Florisil (synthetic magnesium silicate). The solvents, in 100-milliliter portions, and the order used, were as follows: benzene, benzene, six portions of hexane hydrocarbons (Skellysolve B) plus five percent acetone, six portions of Skellysolve B plus ten percent acetone, and six portions of Skellysolve B plus fifteen percent acetone. The first portion of Skellysolve B plus fifteen percent acetone eluate contained 65 milligrams of solids; the second, 106 milligrams; the third, 28 milligrams; and the remaining fractions contained from traces to fourteen milligrams of solids. The fractions weighing 65 milligrams and 106 milligrams were 21-acetoxy-11β-hydroxyprogesterone (corticosterone acetate) which melted at 138 to 143 degrees centigrade and 146.5 to 147.5 degrees centigrade, respectively. The melting point of this material was not depressed when taken with an authentic sample of corticosterone acetate and the structure thereof was confirmed by infrared analysis.

*Example 10.—11α-hydroxy-21-acetoxyprogesterone (epicorticosterone acetate)*

The sodium enolate of 21-ethoxyoxalyl-11α-hydroxyprogesterone was treated with iodine in methanol, followed by sodium methoxide to give 21-iodo-11α-hydroxyprogesterone, melting at 92–102 degrees centigrade, in forty percent yield. This iodo compound was then treated with sodium acetate in acetone to give 21-acetoxy-11α-hydroxyprogesterone, melting at 159 to 163 degrees centigrade and not depressing the melting point of an authentic sample obtained by the bioxygenation of 11-desoxycorticosterone acetate followed by the reacetylation of the 21-hydroxy group (Murray and Peterson, U. S. Patent 2,602,769, issued July 8, 1952).

*Example 11.—11-keto-21-acetoxyprogesterone*

A solution of 2.65 grams of the sodium enolate of 21-ethoxy-oxalyl-11-ketoprogesterone in 25 milliliters of methanol was cooled to about minus twenty degrees centigrade in an ice-salt bath and a solution of 1.5 grams of iodine dissolved in 36 milliliters of methanol was added thereto with stirring, the addition being completed in about one hour. The mixture was then stirred for an additional 1.25 hours, whereafter 1.70 milliliters of a 3.4 normal solution of sodium methoxide in methanol was added thereto. After stirring for an additional hour at zero degrees centigrade, 200 milliliters of water and forty grams of solid sodium chloride were added to the reaction mixture. The thus-precipitated reddish-brown 21-iodo-11-ketoprogesterone was filtered from the reaction mixture, washed with water and without further purification converted to 21-acetoxy-11-ketoprogesterone in the following manner.

To a mixture of thirty grams of potassium bicarbonate and eighteen grams of acetic acid was added the moist 21-iodo-11-ketoprogesterone obtained as above followed by 200 milliliters of acetone. The mixture was refluxed for one hour and then allowed to stand at room temperature for three days. The inorganic material was removed by filtration and washed with acetone. The combined filtrate and washings were evaporated under reduced pressure and the residue dissolved in benzene and chromatographed over eight grams of Florisil (synthetic magnesium silicate). The column was developed with 100-milliliter portions of solvents of the following composition and order: eleven portions of benzene, seven portions of ether, four portions of nine parts of ether to one part of acetone, seven portions of eight parts of ether to two parts of acetone, and finally one portion of acetone. The residues of the first three portions of eight parts of ether to two parts of acetone eluates were combined and recrystallized from ethyl acetate to a constant melting point of 181–182.5 degrees centigrade. The 21-acetoxy-11-ketoprogesterone thus-produced was shown to be identical with an authentic sample by infrared analysis. 21-acetoxy-11-ketoprogesterone is also prepared by the chromic acid oxidation of the 21-acetoxy-11α-hydroxyprogesterone obtained according to the method of Example 10.

In the same manner as described in Example 9, 10 or 11, other 21-acyloxy homologues of the products produced therein are prepared by substituting an alkali-metal salt of the selected acid for the potassium acetate used therein. Compounds thus-produced include 11-keto-21-acyloxyprogesterones, 11α-hydroxy-21-acyloxyprogesterones, and 11β-hydroxy-21-acyloxyprogesterones wherein the acyloxy group is formyloxy, propionyloxy, butyryloxy, β-cyclopentylpropionyloxy, trimethylacetoxy, dimethylacetoxy, octanoyloxy, and the like.

It is to be understood that the invention is not to be limited to the exact details or exact compounds shown and described, as obvious modifications and equivalents will be apparent to one skilled in the art, and the invention is therefore to be limited only by the scope of the appended claims.

We claim:
1. In a process for the production of an 11-oxygenated-21-glyoxalated progesterone represented by the following formula:

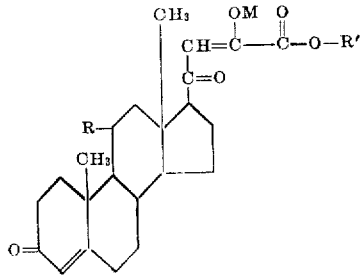

wherein R is selected from the group consisting of an α-hydroxy group, a β-hydroxy group, and a ketonic oxygen; wherein M is selected from the group consisting of hydrogen and an alkali metal; and wherein R' is selected from the group consisting of hydrogen and an alkyl group, the step which comprises: mixing a compound selected from the group consisting of 11-ketoprogesterone, 11α-hydroxyprogesterone, and 11β-hydroxyprogesterone, with an alkyl diester of oxalic acid in the presence of up to about one molar equivalent of an alkali-metal base and at a temperature between about zero degrees centigrade and the boiling point of the reaction mixture, to produce the corresponding 11-oxygenated-21-alkoxyoxalylprogesterone alkali-metal enolate.

2. A process for the production of 11-hydroxy-21-alkoxyoxalylprogesterone alkali-metal enolates which comprises: mixing, under essentially anhydrous conditions, 11-hydroxyprogesterone with an alkyl diester of oxalic acid in the presence of an organic solvent and in the presence of up to about one molar equivalent of an alkali-metal alkoxide and at a temperature between about zero degrees centigrade and the boiling point of the reaction mixture, to produce an 11-hydroxy-21-alkoxyoxalylprogesterone alkali-metal enolate.

3. The process of claim 2 wherein the 11-hydroxyprogesterone is 11α-hydroxyprogesterone.

4. The process of claim 2 wherein the 11-hydroxyprogesterone is 11β-hydroxyprogesterone.

5. A process for the production of an 11-keto-21-alkoxyoxalylprogesterone alkali-metal enolate which comprises: mixing, under essentially anhydrous conditions, 11-ketoprogesterone with an alkyl diester of oxalic acid in the presence of an organic solvent and up to about one molar equivalent of an alkali-metal alkoxide and at a temperature between about zero degrees centigrade and the boiling point of the reaction mixture, to produce an 11-keto-21-alkoxyloxalylprogesterone alkali-metal enolate.

6. The process of claim 5 wherein the alkali-metal alkoxide is a sodium alkoxide.

7. A process for the production of an 11α-hydroxy-21-alkoxyoxalylprogesterone sodium enolate which comprises: mixing, under essentially anhydrous conditions, 11α-hydroxyprogesterone with an alkyl diester of oxalic acid in the presence of an organic solvent and up to about one molar equivalent of a sodium alkoxide and at a temperature between about zero degrees centigrade and the boiling point of the reaction mixture, to produce an 11α-hydroxy-21-alkoxyoxalylprogesterone sodium enolate.

8. A process for the production of an 11β-hydroxy-21-alkoxyoxalylprogesterone sodium enolate which comprises: mixing, under essentially anhydrous conditions, 11β-hydroxyprogesterone with an alkyl diester of oxalic acid in the presence of an organic solvent and up to about one molar equivalent of a sodium alkoxide and at a temperature between about zero degrees centigrade and the boiling point of the reaction mixture, to produce an 11β-hydroxy-21-alkoxyoxalylprogesterone sodium enolate.

9. A process for the production of 11β-hydroxy-21-ethoxyoxalylprogesterone sodium enolate which comprises: mixing, under essentially anhydrous conditions, 11β-hydroxyprogesterone with ethyl oxalate in the presence of an organic solvent and up to about one molar equivalent of sodium methoxide and at a temperature between about zero degrees centigrade and the boiling point of the reaction mixture, to produce 11β- droxy - 21 - methoxyoxlylprogesterone sodium enolate.

10. A process for the production of 11β-hydroxy - 21 - methoxyalylprogesterone sodium enolate which comprises: mixing, under essentially anhydrous conditions, 11β-hydroxyprogesterone with methyl oxalate in the presence of an organic solvent and up to about one molar equivalent of sodium methoxide and at a temperature between about zero degrees centigrade and the boiling point of the reaction mixture, to produce 11β-hydroxy-21-methoxyoxalylprogesterone sodium enolate.

11. A process for the production of 11α-hydroxy-21-ethoxyoxalylprogesterone sodium enolate which comprises: mixing, under essentially anhydrous conditions, 11α-hydroxyprogesterone with ethyl oxalate in the presence of an organic solvent and up to about one molar equivalent of sodium methoxide and at a temperature between about zero degrees centigrade and the boiling point of the reaction mixture, to produce 11α-hydroxy - 21 - ethoxyoxalylprogesterone sodium enolate.

12. A process for the production of 11α-hydroxy - 21 - methoxyoxalylprogesterone sodium enolate which comprises: mixing, under essentially anhydrous conditions, 11α-hydroxyprogesterone with methyl oxalate in the presence of an organic solvent and up to about one molar equivalent of sodium methoxide and at a temperature between about zero degrees centigrade and the boiling point of the reaction mixture, to produce 11α - hydroxy - 21 - methoxyalylprogesterone sodium enolate.

13. A process for the production of 11-keto-21-ethoxyoxalylprogesterone sodium enolate which comprises: mixing, under essentially anhydrous conditions, 11-ketoprogesterone with ethyl oxalate in the presence of an organic solvent and up to about one molar equivalent of sodium methoxide and at a temperature between about zero degrees centigrade and the boiling point of the reaction mixture, to produce 11-keto-21-ethoxyoxalylprogesterone sodium enolate.

14. A process for the production of an 11-oxygenated - 21 - iodoprogesterone which comprises: (1) mixing a compound selected from the group consisting of 11-ketoprogesterone, 11α-hydroxyprogesterone, and 11β-hydroxyprogesterone, with an alkyl diester of oxalic acid, in the presence of up to about one molar equivalent of an alkali-metal base and at a temperature between about zero degrees centigrade and the boiling point of the reaction mixture, to produce an 11-oxygenated-21-alkoxyoxalylprogesterone alkali-metal enolate; (2) reacting the thus-produced 11 - oxygenated - 21 - alkoxyoxalylprogesterone alkali-metal enolate with about one molar equivalent of iodine to produce an 11-oxygenated-21 - iodo - 21 - alkoxyoxalylprogesterone which is then decarboxylated with an alkanol and a base to produce an 11-oxygenated-21-iodoprogesterone.

15. A process for the production of 11β-hydroxy-21-iodoprogesterone which comprises: (1) contacting 11β-hydroxyprogesterone with an alkyl diester of oxalic acid in the presence of an organic solvent and up to about one molar equivalent of an alkali-metal alkoxide and at a temperature between about zero degrees centigrade and the boiling point of the reaction mixture, to produce 11β-hydroxy-21-alkoxyoxalylprogesterone alkali-metal enolate; (2) reacting the thus - produced 11β - hydroxy - 21 - alkoxyoxalylprogesterone alkali-metal enolate with iodine to produce 11β - hydroxy - 21 - iodo - 21 - alkoxyoxalylprogesterone which is then decarboxylated with an alkanol and a base to produce 11β-hydroxy-21-iodoprogesterone.

16. A process for the production of 11α-hydroxy-21-iodoprogesterone which comprises: (1) reacting 11α-hydroxyprogesterone with an alkyl diester of oxalic acid in the presence of an organic solvent and up to about one molar equivalent of an alkali-metal alkoxide and at a temperature between about zero degrees centigrade and the boiling point of the reaction mixture, to produce 11α-hydroxy-21-alkoxyoxalylprogesterone alkali-metal enolate; (2) reacting the thus produced 11α-hydroxy-21-alkoxyoxalylprogesterone alkali-metal enolate with iodine to produce 11α-hydroxy - 21 - iodo - 21 - alkoxyoxalylprogesterone which is then decarboxylated in the presence of an alkanol and a base to produce 11α-hydroxy-21-iodoprogesterone.

17. A process for the production of 11-keto-21-iodoprogesterone which comprises: (1) reacting 11-ketoprogesterone with an alkyl diester of oxalic acid in the presence of an organic solvent and up to about one molar equivalent of an alkali-metal alkoxide and at a temperature between about zero degrees centigrade and the boiling point of the reaction mixture, to produce 11-keto-21-alkoxyoxalylprogesterone alkali-metal enolate; (2) reacting the thus-produced 11-keto-21-alkoxyoxalylprogesterone alkali-metal enolate with iodine to produce 11-keto-21-iodo-21-alkoxyoxalylprogesterone which is decarboxylated in the presence of an alkanol and a base to produce 11-keto-21-iodoprogesterone.

18. A process for the production of an 11-oxygenated - 21 - acyloxyprogesterone which comprises: (1) mixing a compound selected from the group consisting of 11-ketoprogesterone, 11α-hydroxyprogesterone, and 11β-hydroxyprogesterone, with an alkyl diester of oxalic acid, in the presence of up to about one molar equivalent of an alkali-metal base and at a temperature between about zero degrees centigrade and the boiling point of the reaction mixture, to produce an 11-oxygenated - 21 - alkoxyoxalylprogesterone alkali-metal enolate; (2) reacting the thus-produced 11-oxygenated-21-alkoxyoxalylprogesterone alkali-metal enolate with about one molar equivalent of iodine to produce an 11-oxygenated-21-iodo - 21 - alkoxyoxalylprogesterone which is then decarboxylated with an alkanol and a base to produce an 11-oxygenated-21-iodoprogesterone; (3) and then reacting the thus-produced 11-oxygenated-21-iodoprogesterone with an alkali-metal salt of an organic carboxylic acid to produce an 11-oxygenated-21-acyloxyprogesterone.

19. A process for the producition of 11β-hydroxy-21-acyloxyprogesterone which comprises: (1) mixing 11β-hydroxyprogesterone with an alkyl diester of oxalic acid in the presence of an organic solvent and up to about one molar equivalent of an alkali-metal alkoxide and at a temperature between about zero degrees centigrade and the boiling point of the reaction mixture, to produce an 11β-hydroxy-21-alkoxyoxalylprogesterone alkali-metal enolate; (2) reacting the thus-produced 11β-hydroxy - 21 - alkoxyoxalylprogesterone alkali-metal enolate with iodine to produce 11β-hydroxy-21-iodo - 21 - alkoxyoxalylprogesterone which is then decarboxylated with an alkanol and a base to produce 11β-hydroxy-21-iodoprogesterone; (3) and then reacting the thus-produced 11β-hydroxy-21-iodoprogesterone with an alkali-metal salt of an organic carboxylic acid to produce 11β-hydroxy-21-acyloxyprogesterone.

20. The process of claim 19 wherein the organic carboxylic acid is acetic acid.

21. A process for the production of 11α-hydroxy-21-acyloxyprogesterone which comprises: (1) mixing 11α-hydroxyprogesterone with an alkyl diester of oxalic acid in the presence of an organic solvent and up to about one molar equivalent of an alkali-metal alkoxide and at a temperature between about zero degrees centigrade and the boiling point of the reaction mixture, to produce an 11α-hydroxy-21-alkoxyoxalylprogesterone alkali-metal enolate; (2) reacting the thus-produced 11α-hydroxy-21-alkoxyoxalylprogesterone alkali-metal enolate with iodine to produce 11α-hydroxy-21-iodo - 21 - alkoxyoxalylprogesterone which is then decarboxylated in the presence of an alkanol and a base to produce 11α-hydroxy-21-iodoprogesterone; (3) and then reacting the thus-produced 11α-hydroxy-21-iodoprogesterone with an alkali-metal salt of an organic carboxylic acid to produce an 11α-hydroxy-21-acyloxyprogesterone.

22. The process of claim 21 wherein the organic carboxylic acid is acetic acid.

23. A process for the production of 11-keto-21-acyloxyprogesterone which comprises: (1) mixing 11-ketoprogesterone with an alkyl diester of oxalic acid in the presence of an organic solvent and up to about one molar equivalent of an alkali-metal alkoxide and at a temperature between about zero degrees centigrade and the boiling point of the reaction mixture, to produce an 11-keto - 21 - alkoxyoxalylprogesterone alkali-metal enolate; (2) reacting the thus-produced 11-keto-21-alkoxyoxalylprogesterone alkali-metal enolate with iodine to produce 11-keto - 21 - iodo-21-alkoxyoxalylprogesterone which is decarboxylated in the presence of an alkanol and a base to produce 11-keto-21-iodoprogesterone; (3) and then reacting the thus-produced 11-keto-21-iodoprogesterone with an alkali-metal salt of an organic carboxylic acid to produce 11-keto-21-acyloxyprogesterone.

24. The process of claim 23 wherein the organic carboxylic acid is acetic acid.

25. A compound represented by the following structural formula:

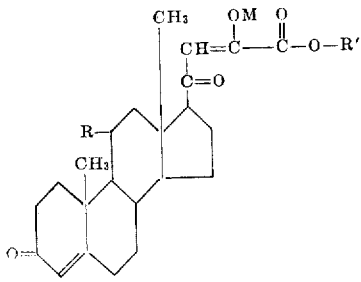

wherein R is selected from the group consisting of an α-hydroxy group, a β-hydroxy group, and a ketonic oxygen; wherein M is selected from the group consisting of hydrogen and an alkali metal; and wherein R' is selected from the group consisting of hydrogen and a lower-alkyl group.

26. 11 - hydroxy - 21 - lower - alkoxyoxalylprogesterone alkali-metal enolates.

27. A compound of claim 26 wherein the hydroxy group is the α-hydroxy group.

28. A compound of claim 26 wherein the hydroxy group is the β-hydroxy group.

29. 11-keto-21-lower-alkoxyoxalylprogesterone alkali-metal enolates.

30. A compound of claim 29 wherein the alkali-metal enolate is the sodium enolate.

31. 11α - hydroxy - 21 - lower - alkoxyoxalylprogesterone sodium enolates.

32. 11β - hydroxy - 21 - lower - alkoxyoxalylprogesterone sodium enolates.

33. 11β - hydroxy - 21 - ethoxyoxalylprogesterone sodium enolate.

34. 11α - hydroxy - 21 - ethoxyoxalylprogesterone sodium enolate.

35. 11 - keto - 21 - ethoxyoxalylprogesterone sodium enolate.

36. 11α - hydroxy - 21 - methoxyoxalylprogesterone sodium enolate.

37. 11β - hydroxy - 21 - methoxyoxalylprogesterone sodium enolate.

No references cited.

UNITED STATES PATENT OFFICE

CERTIFICATE OF CORRECTION

Patent No. 2,683,724 July 13, 1954

John A. Hogg et al.

It is hereby certified that error appears in the printed specification of the above numbered patent requiring correction and that the said Letters Patent should read as corrected below.

Column 2, line 53, and column 3, line 8, for "R", each occurrence, read --R'--.

Signed and sealed this 24th day of September 1957.

(SEAL)
Attest:
KARL H. AXLINE
Attesting Officer

ROBERT C. WATSON
Commissioner of Patents